Nov. 8, 1960 P. J. MESSER 2,959,108
SURFACE GENERATING MACHINE
Filed Aug. 15, 1956 10 Sheets-Sheet 1

INVENTOR.
Paul J. Messer
BY
Olson & Trexler
attys.

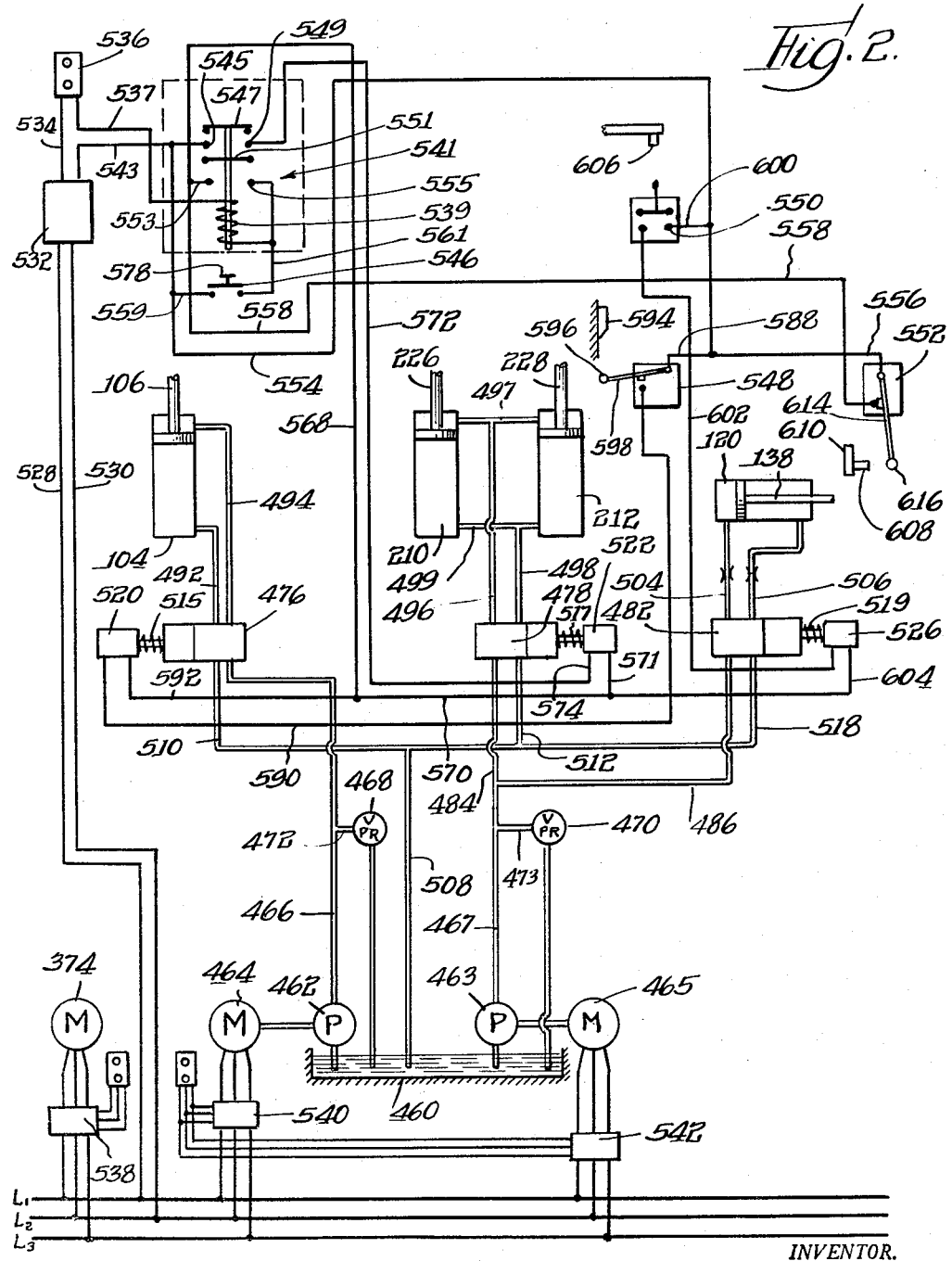

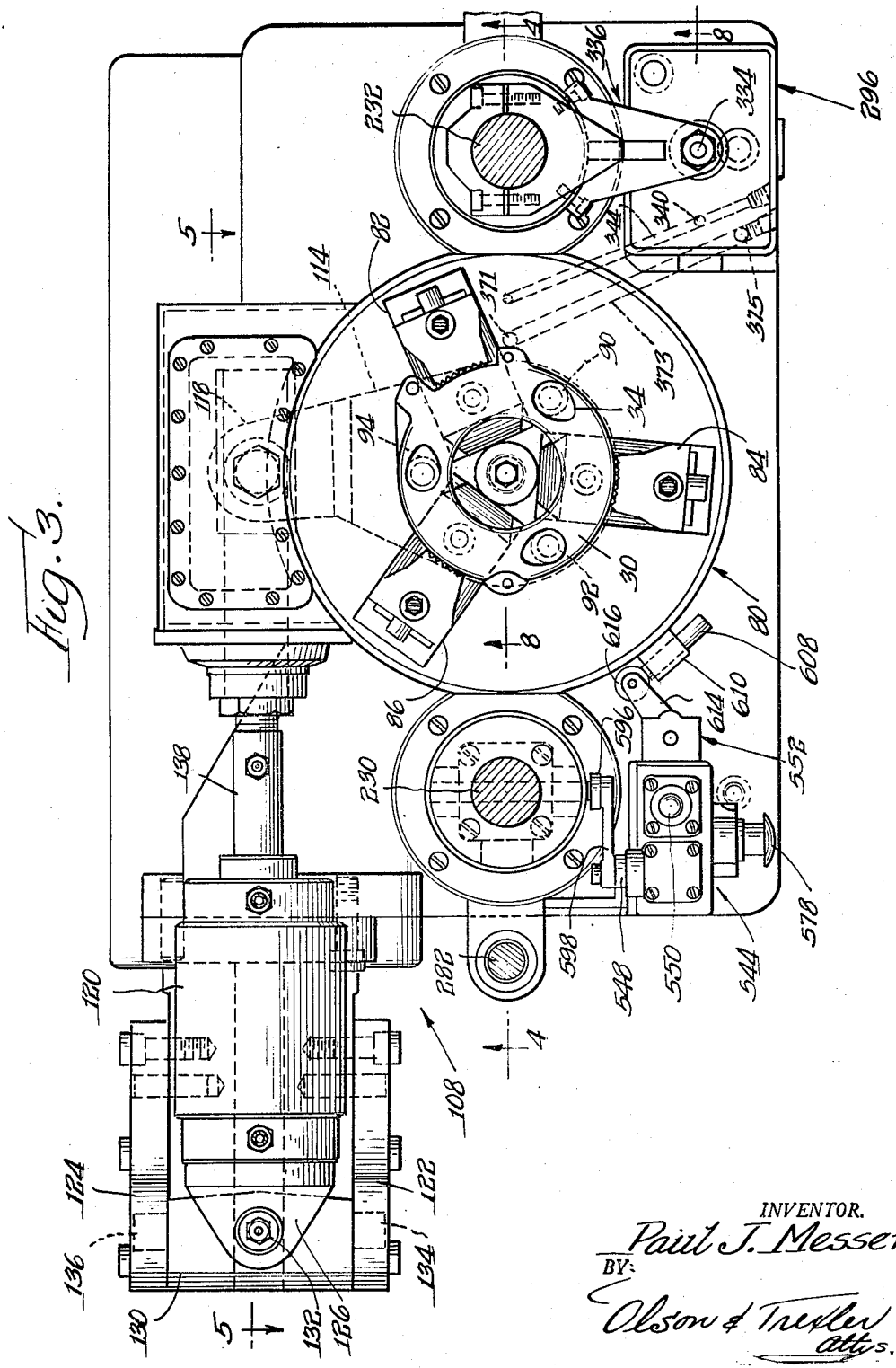

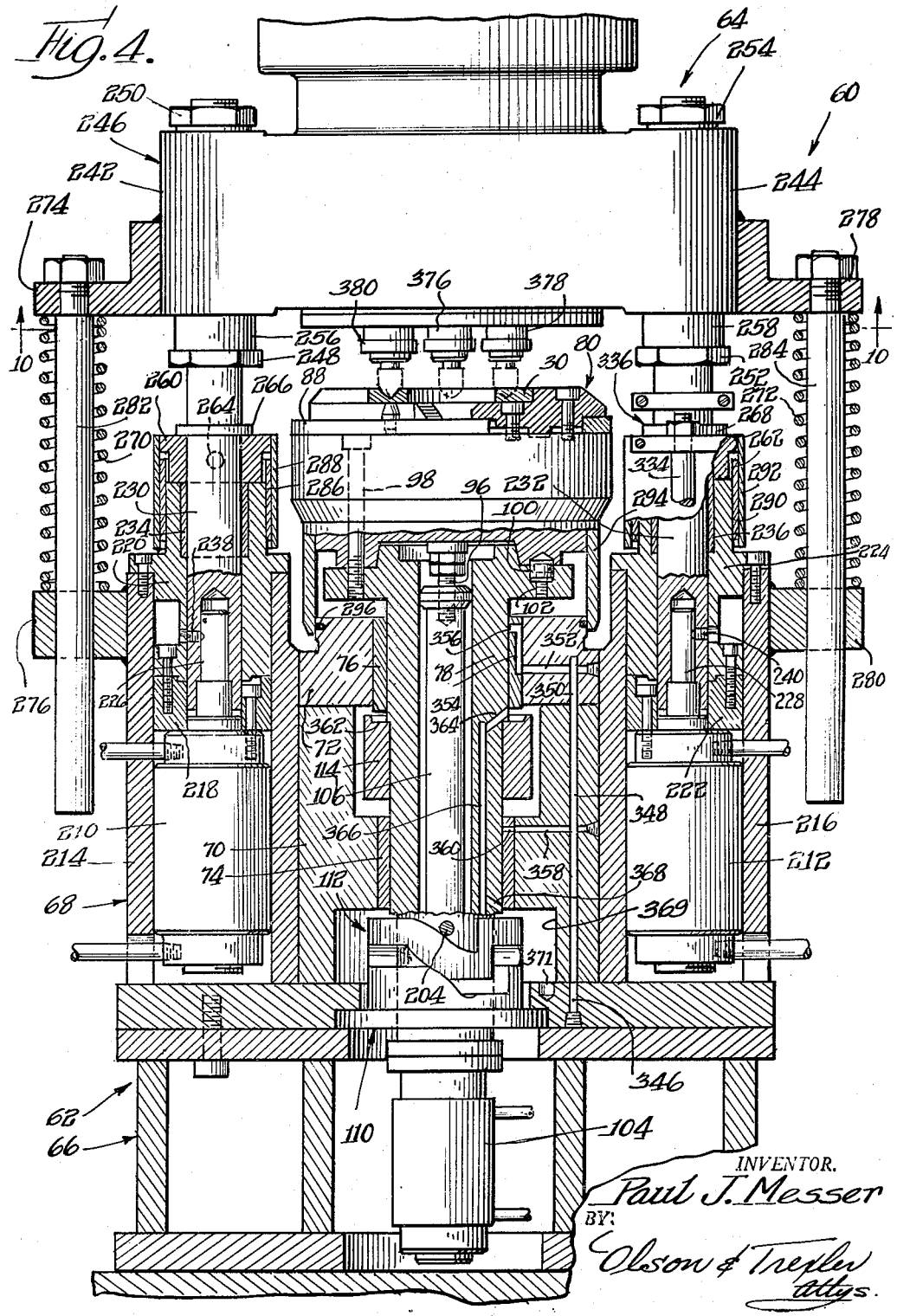

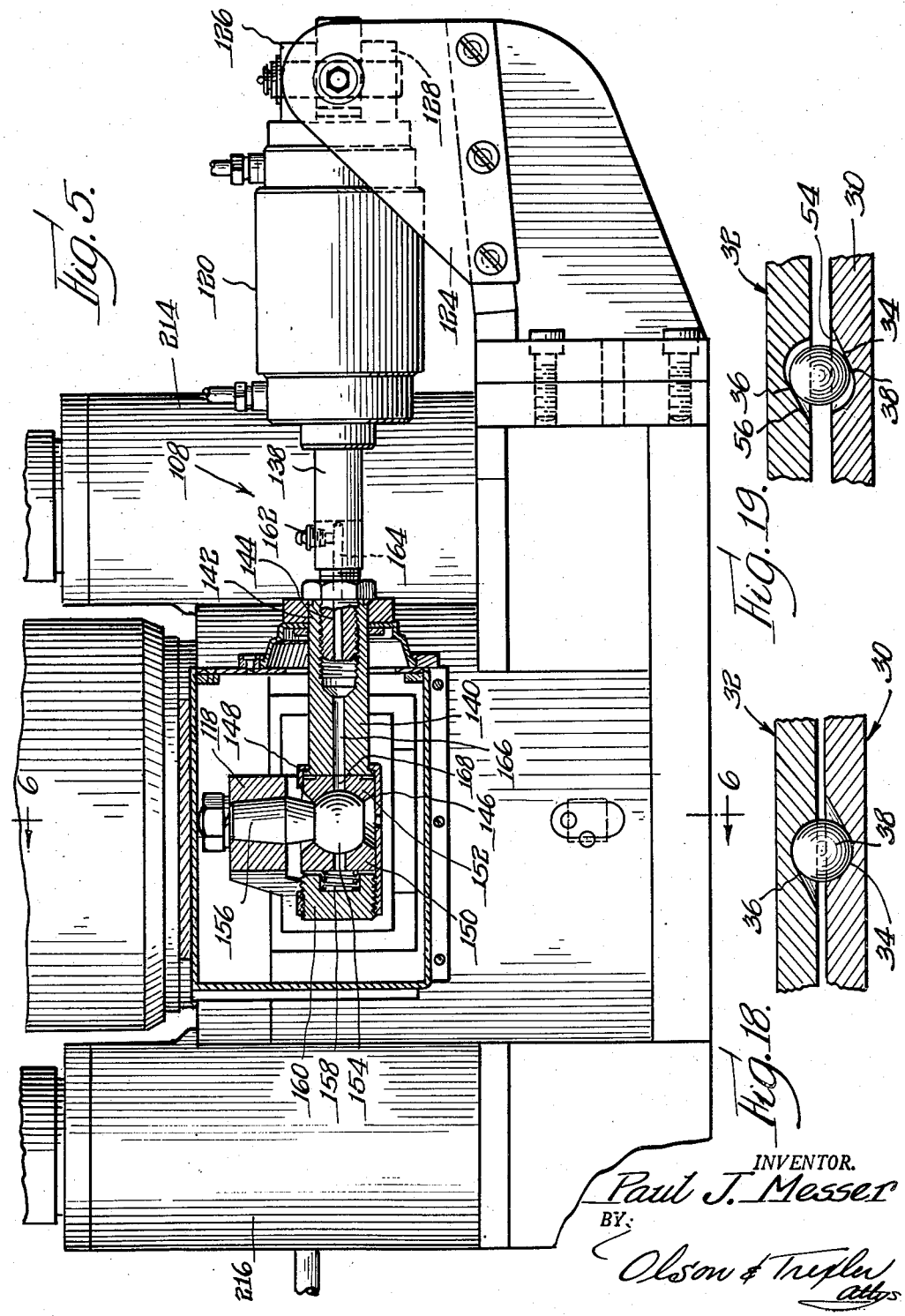

Nov. 8, 1960  P. J. MESSER  2,959,108
SURFACE GENERATING MACHINE
Filed Aug. 15, 1956  10 Sheets-Sheet 6
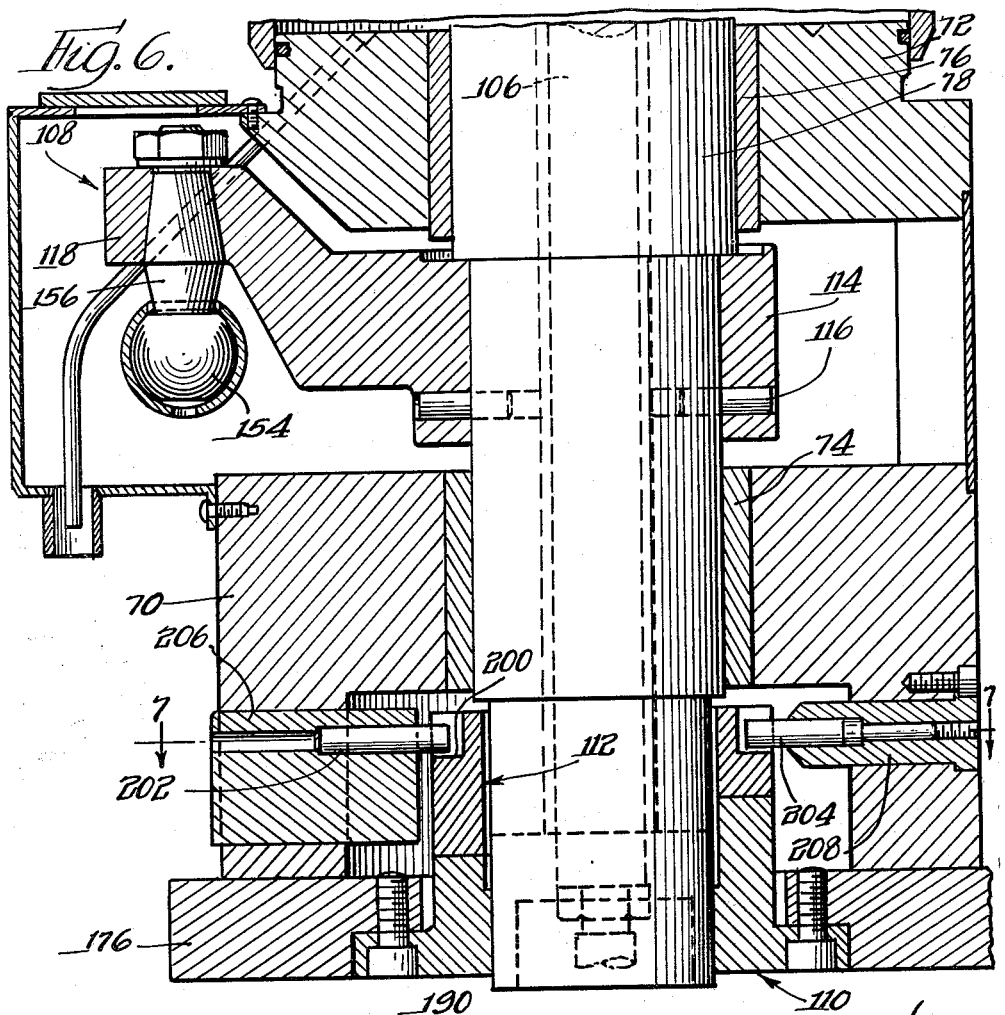
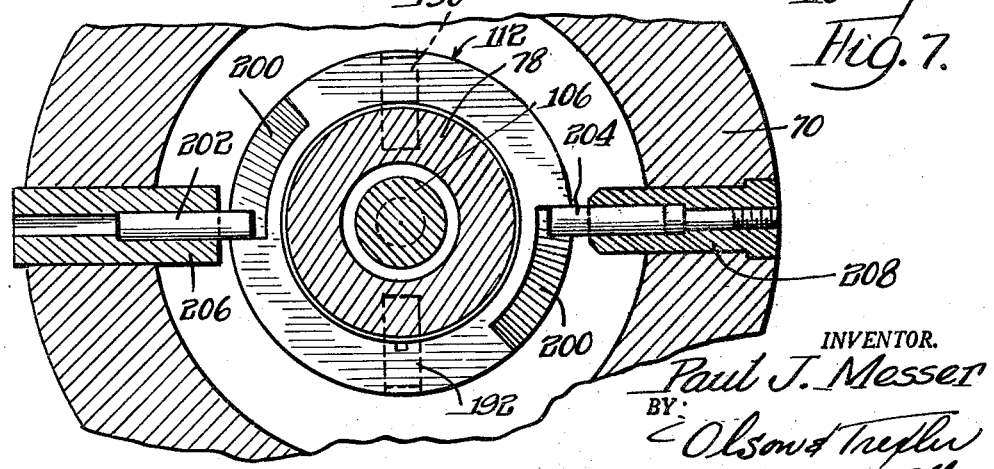
INVENTOR.
Paul J. Messer
BY
Olson & Trexler
attys.

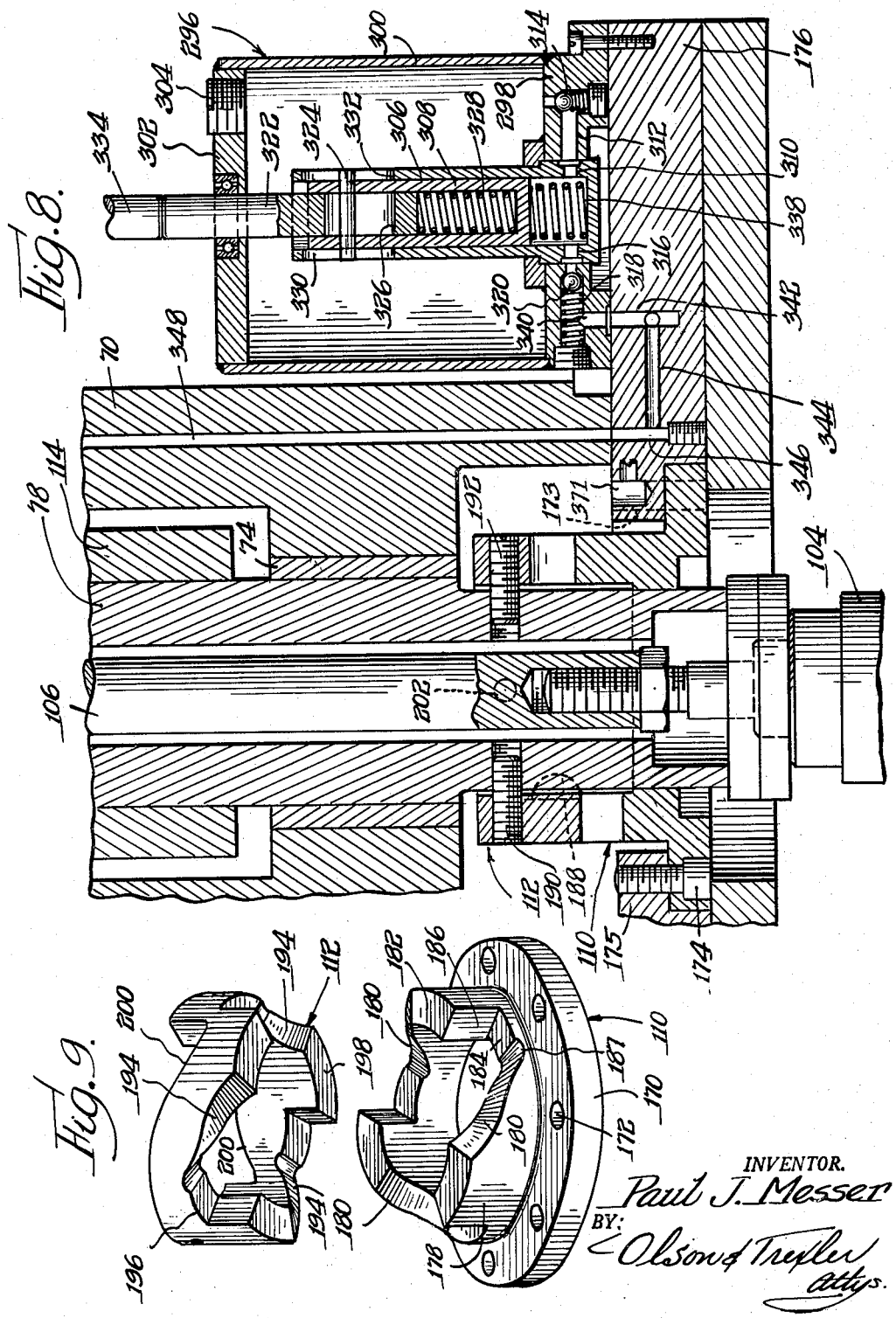

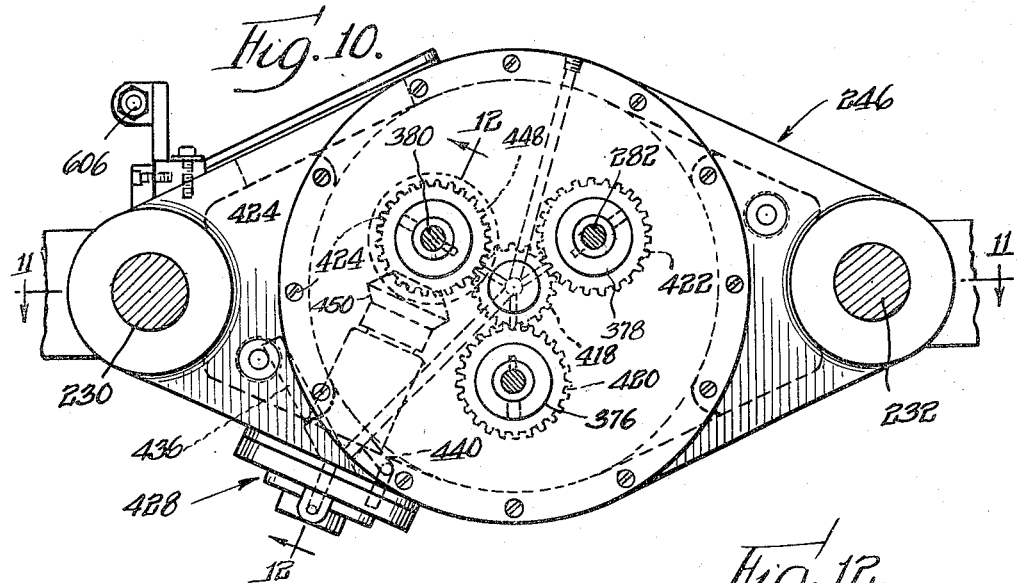
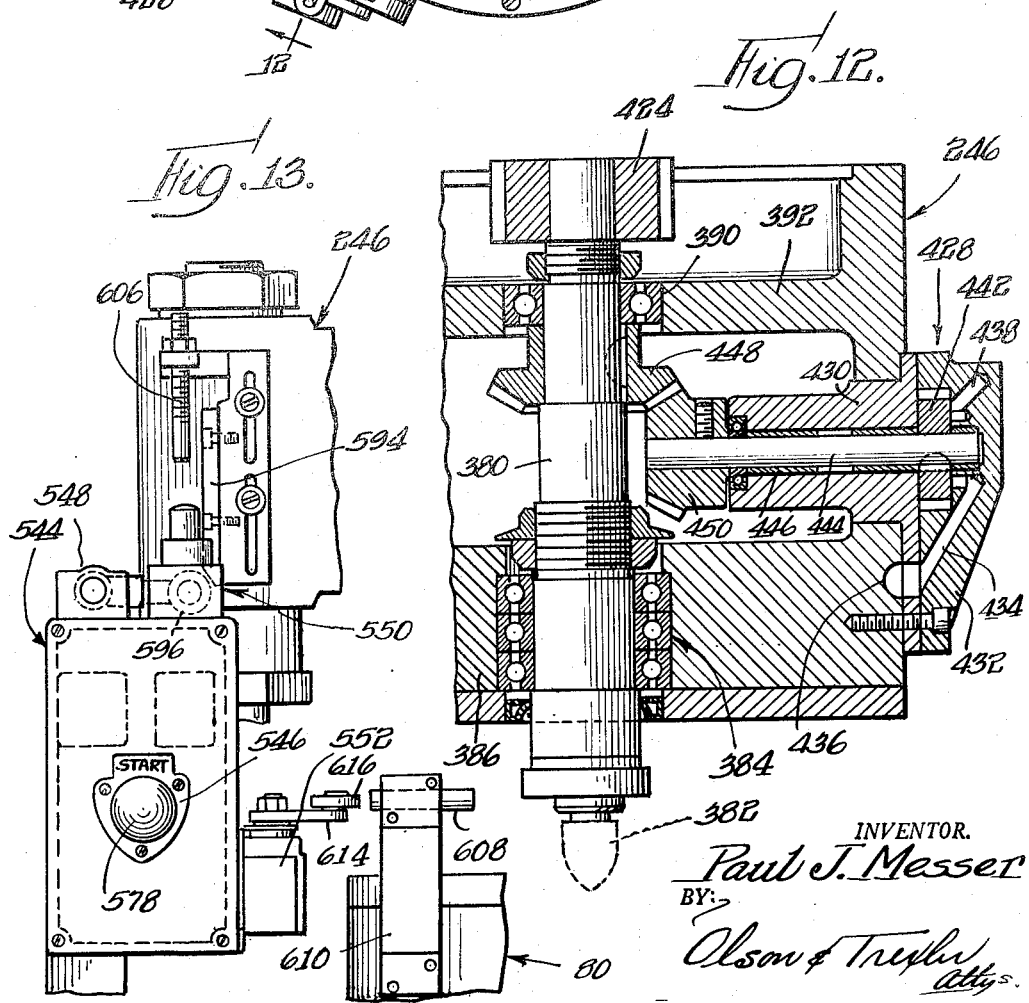

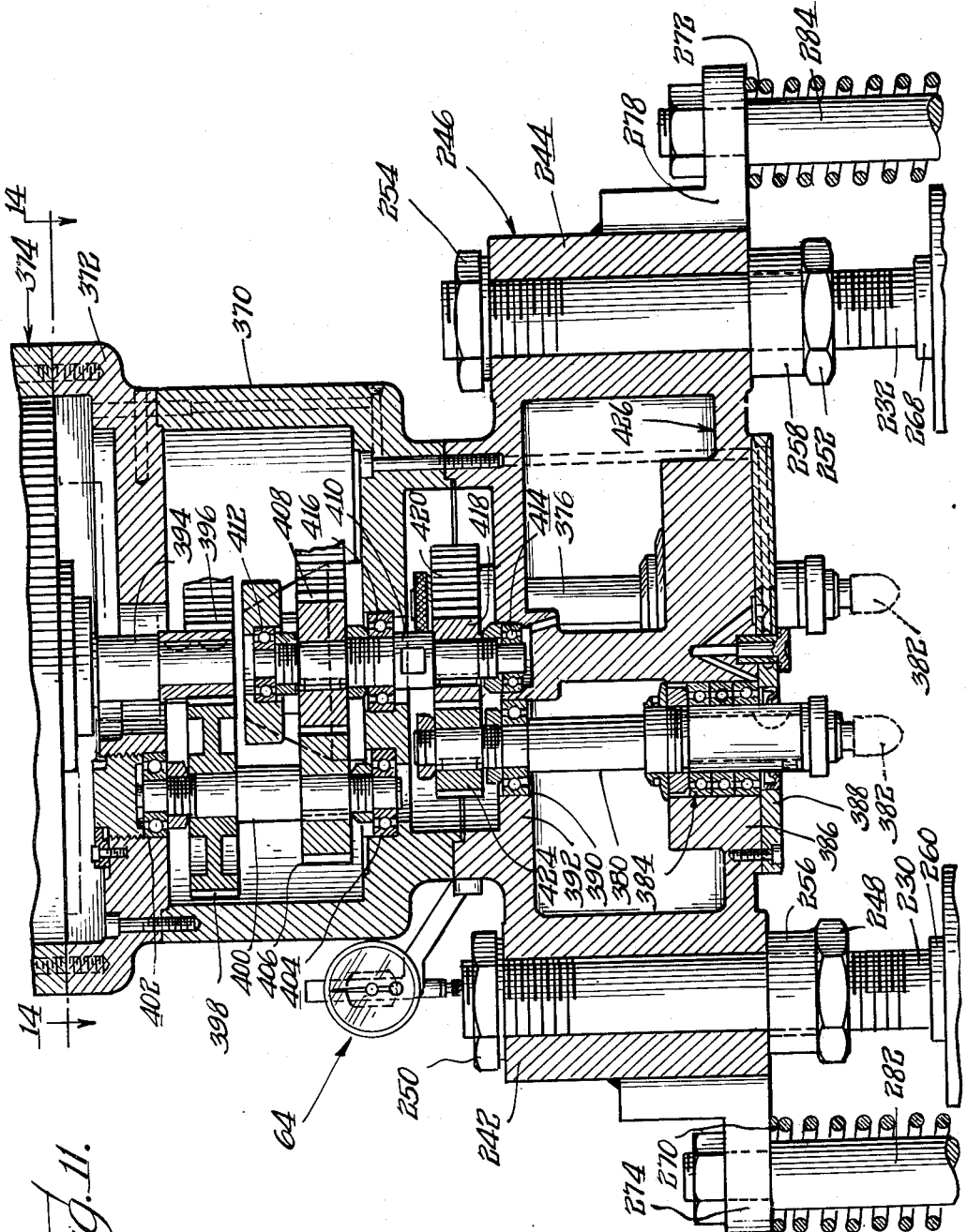

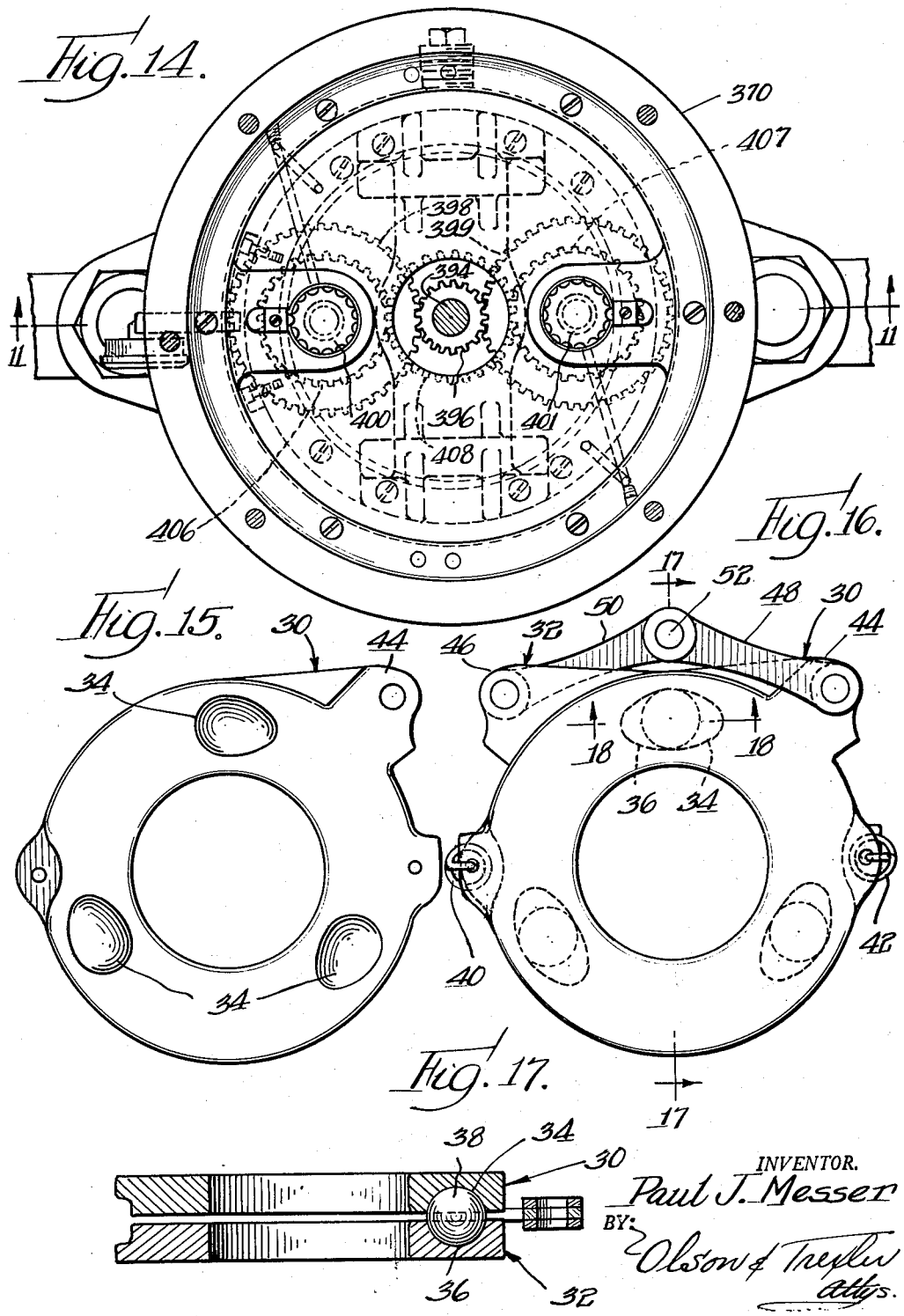

US United States Patent Office 2,959,108
Patented Nov. 8, 1960

2,959,108

SURFACE GENERATING MACHINE

Paul J. Messer, Chicago, Ill., assignor, by mesne assignments, to Lambert Brake Corporation, St. Joseph, Mich., a corporation of Michigan Filed Aug. 15, 1956, Ser. No. 604,161

6 Claims. (Cl. 90—11)

The present invention relates to a novel apparatus for forming surfaces on workpieces and, more particularly, to a novel apparatus for generating cam surfaces or the like on workpieces.

While various uses for certain features of the present invention may suggest themselves, the apparatus is especially useful for generating ball cam seats or surfaces on disk members for disk brakes of the type disclosed in Patent No. 2,387,039. Reference is made to this patent for a more complete disclosure of the brake structure, but it may be briefly stated here that such a brake structure includes a pair of adjacent disk members having a plurality of opposing ball cam seats, and ball elements disposed between the opposing cam seats of the disk members so that when the disk members are rotated slightly relative to each other, the ball elements ride up on the cam surfaces or seats to spread the disk members and actuate the brake. In such a brake structure, it is important to have the ball cam seats in each of the disk members precisely and uniformly formed within close tolerances so as to insure proper and quiet operation of the brake. Prior to the present invention such ball cam seats were formed during completely separate operations so that production of each disk member was relatively slow and expensive and so that it was relatively difficult to provide each disk member with a plurality of substantially uniform ball cam seats or surfaces.

It is an important object of the present invention to provide a novel apparatus which is capable of simultaneously and substantially uniformly generating a plurality of surfaces on a workpiece, which surfaces are elongated and vary in depth.

A more specific object of the present invention is to provide a novel apparatus for simultaneously and substantially uniformly generating a plurality of ball cam surfaces or seats or the like in a workpiece during combined axial and rotational relative feeding movement between surface generating tool means and the workpiece.

Another object of the present invention is to provide a novel apparatus capable of automatically, rapidly and economically generating a plurality of cam surfaces or the like spaced about a circle on a workpiece.

Further objects of the present invention are to provide a novel apparatus of the above described type which is of relatively simple and rugged construction and which may be easily operated even by an unskilled workman.

Other and more detailed objects of the present invention will become apparent from the following description and the accompanying drawings wherein:

Fig. 2 is a diagrammatic view showing a control circuit for the novel apparatus;

Fig. 3 is a horizontal sectional view taken along line 3—3 in Fig. 1;

Fig. 4 is a partial vertical sectional view taken along line 4—4 in Fig. 3;

Fig. 5 is a partial vertical sectional view taken along line 5—5 in Fig. 3;

Fig. 6 is an enlarged fragmentary sectional view taken along line 6—6 in Fig. 5;

Fig. 7 is a fragmentary sectional view taken along line 7—7 in Fig. 6;

Fig. 8 is an enlarged fragmentary sectional view taken along line 8—8 in Fig. 3;

Fig. 9 is an exploded perspective view showing a pair of cam elements which control the feeding motion of the work with respect to the cutter or generating tools;

Fig. 10 is a sectional view taken along line 10—10 in Fig. 4;

Fig. 11 is an enlarged fragmentary sectional view taken along line 11—11 in Fig. 14;

Fig. 12 is an enlarged fragmentary sectional view taken along line 12—12 in Fig. 10;

Fig. 13 is an enlarged fragmentary elevational view showing certain of the control elements of the apparatus;

Fig. 14 is a sectional view taken along line 14—14 in Fig. 11;

Fig. 15 is an elevational view of a workpiece or disk member which includes a plurality of ball cam seats formed by the apparatus of the present invention;

Fig. 16 is an elevational view showing a subassembly of a brake structure which includes a pair of disk members as shown in Fig. 15 disposed in opposing relationship;

Fig. 17 is a sectional view taken along line 17—17 in Fig. 16;

Fig. 18 is a fragmentary sectional view taken along line 18—18 in Fig. 16; and

Fig. 19 is a fragmentary sectional view similar to Fig. 18 but showing the disk members rotated slightly relative to each other so that the ball member rides up on the cam surfaces and causes the disk members to spread apart.

Figure 1:
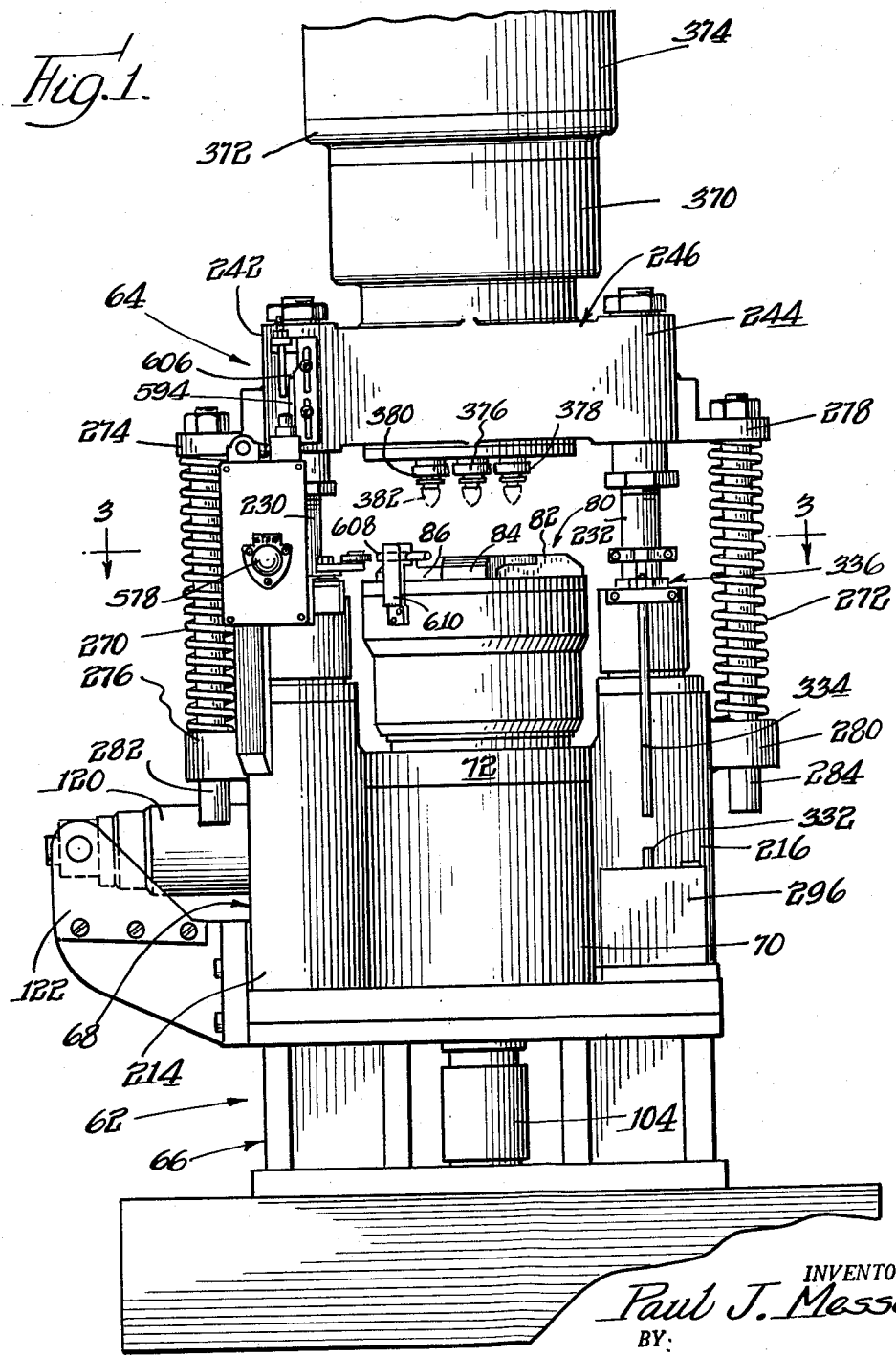
Fig. 1 is an elevational view showing an apparatus incorporating the features of the present invention.

In order to facilitate an understanding of the apparatus, a workpiece or disk member which is to be provided with a plurality of generated ball cam seats or surfaces will be described along with a portion of a brake structure in which the disk member is to be used. Referring particularly to Figs. 15-19, it is seen that the brake structure includes a pair of identical disk members 30 and 32 disposed in opposing relationship and each having a plurality of equally spaced ball cam seats or surfaces 34 and 36, respectively, disposed in opposing relationship. Ball elements 38 are disposed between opposing pairs of seats 34 and 36, and the disk members are yieldably biased and retained toward each other by springs 40 and 42 connected to ears extending from the disks. In this particular form of brake, the disks 30 and 32 respectively include extensions 44 and 46 to which ends of links 48 and 50 are respectively connected. Opposite ends of these links are pivotally connected to each other as at 52 and are adapted to be connected to an actuating member, not shown. The ball members 38 are formed with precision so that they have predetermined uniform diameters. The ball seats are also formed with precision in the manner described below so that their cross sectional shapes taken radially of the disks are curved and have a radius substantially equal to the radius of the ball elements as shown in Fig. 17 so that the ball elements fit within the seats without undesirable looseness. As shown in Figs. 15, 16, 18 and 19, the ball cam seats are elongated so that their major axes extend along an arc of a circle concentric to the disk members, and the seats respectively have portions 54 and 56 which vary in depth along their major axes so as to provide the camming action for spreading the disk members described above. It will be appreciated that when the pivotal connection 52 of the links 48 and 50 is pulled outwardly by any suitable actuating means, not shown, the disk members will be rotated relative to each other so that they will be spread apart as shown in Fig. 19. It is important to have all of the ball cam surfaces of uniform shape and depth so as to prevent canting of the disk members with respect to each other when they are spread apart in order to obtain uniform braking pressure entirely around the disk member.

Referring now particularly to Figs. 1 and 4, it is seen that an apparatus 60 including the features of the present invention comprises a base assembly 62 and a head assembly 64. The base assembly is adapted to hold and feed a workpiece or disk in the manner described below, and the head assembly supports and is adapted to drive a plurality of tools which form the ball cam seats or surfaces. The apparatus also includes means which will be described below for automatically controlling the ball cam seat generating operation so that the machine may be operated by an unskilled workman, if desired.

Referring now to Figs. 1 and 3 through 9, the base assembly 62 includes a base of suitable construction generally designated by numeral 66 and frame means 68 disposed on and extending upwardly from the base and secured to the base by screws or any other suitable means. A central columnar portion of the frame includes fixed members 70 and 72 which respectively provide internal seats for receiving axially spaced bearings 74 and 76. A hollow spindle 78 is journaled for rotation about a vertical axis in the bearings 74 and 76, which spindle carries at its upper end a chuck assembly generally designated by the numeral 80.

In the embodiment shown, the chuck assembly comprises three equally spaced and circularly arranged jaws 82, 84 and 86 slidably disposed for radial movement above a plate 88 for releasably gripping and retaining a workpiece or disk. Support pads 90, 92 and 94 are mounted on the plate 88 between the jaws for supporting the workpiece directly beneath the ball cam seats or surfaces being formed so as to prevent any possible deflection of the workpiece which might cause the cam surfaces to be formed inaccurately. The chuck assembly also includes a reciprocable draw bar 96 which may be actuated so as to cause the jaw members to close and grip a workpiece and to open the jaw members to release the workpiece. The mechanism within the chuck assembly which is actuated by the drawbar for closing and opening the jaw members may be of any suitable known commercial construction and, therefore, need not be shown or described. The chuck is secured to an upper end flange of the spindle 78 by a plurality of screws 98, and a rigid driving connection is provided between the spindle and chuck body by a button 100 which extends into aligned recesses in the spindle flange and chuck body and which is secured to the flange by a screw 102. It is, thus, seen that the chuck is secured for vertical and rotative movement with the spindle 78, which movement is accomplished in the manner described below.

In order to actuate the chuck drawbar 96 to open and close the jaws, a hydraulic cylinder 104 is secured to a flange of a lower end extension of the spindle 78. A rod 106 is connected with a piston operable within the cylinder 104 and extends upwardly through the hollow spindle 78 and is connected to the chuck drawbar 96. Thus, when the piston is actuated downwardly within the cylinder 104, the rod 106 pulls the drawbar 96 downwardly to close the jaws, and when the piston is actuated upwardly, the jaws are opened.

In order to provide a workpiece held by the chuck with combined rotative and axial feeding motion, the apparatus is provided with means generally designated by the numeral 108 in Figs. 3, 5 and 6 for rotating the sleeve 78 the desired amount and the apparatus is provided with cam members 110 and 112 for axially shifting the sleeve as it rotates. The means 108 includes a drive collar 114 fixed to an intermediate portion of the spindle 78 by pins 116 and having an integral lateral extending crank arm 118. An actuating hydraulic cylinder 120 has one end thereof mounted for universal pivotal movement between side plates 122 and 124 of support bracket means secured to the machine frame. More specifically, ears 126 and 128 extending from an outer end of the cylinder are pivotally connected for movement about a vertical axis to a member 130 by a pin 132, which member 130 is mounted for movement about a horizontal axis by pins 134 and 136 extending into apertures in the bracket side members 122 and 124, respectively. A piston rod 138 extends from the cylinder 120 generally toward the crank arm 118 and is connected to the crank arm by adjustable universal joint means shown in Figs. 5 and 6. This universal joint means includes a piston rod extension shaft 140 having an internally threaded portion 142 adjustably turned onto an externally threaded portion 144 of the piston rod so that the effective length of the piston rod may be adjusted or varied as desired. A free end of the shaft extension 140 extends through an aperture in a cage 146 and is provided with an annular flange 148 for retaining the cage while permitting the shaft 140 to be rotated for adjustment purposes without rotating the cage. Split socket members 150 and 152 are disposed within the cage for enclosing a ball portion 154 of a stud 156 which is secured to the outer end of the crank arm 118. The socket members are resiliently maintained in engagement with the ball portion of the stud by a spring 158 which is compressed between the socket member 150 and a plug 160 connected with the cage. In order to lubricate the ball joint, a grease fitting 162 is mounted on the piston rod 138 and communicates with a passageway 164 in the piston rod which, in turn, communicates with passageways 166 and 168 in the shaft extension 140 and socket member 152.

The cam member 110 is provided with a lower marginal flange 170 having a plurality of apertures 172 therethrough for accommodating screws 174 and dowel pins 173 by which this cam member is secured to a flange portion 175 of a plate member 176 which comprises a part of the machine frame 68. An annular portion 178 of the cam member 110 extends axially upwardly from the flange 170 and is provided with a plurality of circumferentially spaced inclined cam surfaces 180. The angle of inclination of these cam surfaces with respect to the axis of the cam member is equal to the angle of inclination of the ball cam surface to be formed in a workpiece. The inclined cam surface portions 180 are separated from each other by upper and lower flat surface portions 182 and 184 which are joined by a vertical wall 186. The junctions between the lower flat surface portions 184 and the inclined cam surfaces 180 are recessed as indicated at 187 so as to eliminate any need for precisely forming corners between these surfaces.

The annular cam member 112 is complementary to the cam member 110 and is fixed to the spindle 78 by a key 188 and by screws 190 and 192. More specifically, the cam member 112 is provided with inclined cam surfaces 194 adapted to mate with the cam surfaces 180 and upper and lower flat surface portions 196 and 198 respectively coextensive with the upper and lower flat surface portions 182 and 184 of the fixed cam member 110. It will be appreciated that with this structure the cam member 112 will ride up on the cam member 110 when the spindle 78 is rotated in the manner described above so as to raise the spindle and the chuck and impart combined axial and rotative feeding motion to a workpiece held by the chuck. It will also be appreciated that the universal pivotal support for the spindle actuating cylinder 120 in the universal joint between the actuating piston rod extension and the crank arm 118 enables the spindle to be raised in this manner without interfering with the operation of the fluid or hydraulic cylinder.

The cam member 112 also includes a pair of inclined cam surfaces 200 along its upper margin, which surfaces are disposed at the same angle to the axis of the cam member as the cam surfaces 194. As shown in Figs. 6, 7, and 8, a pair of pins 202 and 204 respectively extend over the oppositely disposed cam surfaces 200 and are rigidly supported by pin holders 206 and 208 mounted in the frame member 70. The pins 202 and 204 cooperate with the cam surfaces 200 so as to insure proper engagement of the cam surfaces 194 of the member 112 with the cam surfaces 180 of the member 110 during forward and reverse rotative movement of the spindle and the resulting up-and-down movement of the cam member 112 and spindle unit.

The base assembly is provided with means for supporting the head assembly 64 and for shifting the head assembly to move the cutting or ball cam surface generating tools thereof to and from operative and inoperative positions, which means is shown in Figs. 1, 3, 4 and 11. More specifically, this means includes a pair of vertically disposed double-acting hydraulic cylinders 210 and 212 respectively at opposite sides of the base assembly and disposed within upstanding tubular members 214 and 216 of the machine frame. The upper end of the cylinder 210 is secured to an adapter block 218 that is connected to the lower end of a sleeve 220 having a flange overlying and secured to the upper end of the frame member 214. The cylinder 212 is similarly supported by an adapter block 222 and a sleeve member 224 secured to the frame member 216. Within the cylinders 210 and 212 are hydraulically operable pistons, not shown, to which are secured upwardly extending piston rods 226 and 228 respectively. Head assembly guide and support rods 230 and 232 are respectively slidably disposed within the sleeve members 220 and 224 and bushings 234 and 236 mounted within recesses in the sleeve members. Lower end portions of the guide and support rods are provided with sockets which receive the piston rods 226 and 228 respectively and are fixed to the piston rods for movement therewith by set screws 238 and 240. Upper end portions of the guide and support rods 230 and 232 are threaded and extend through tubular portions 242 and 244 of a head frame member 246 of the head assembly. Nut members 248—250 and 252—254 are provided on the rods 230 and 232 for adjustably securing the head member 246 on the rod. Preferably, spacers 256 and 258 are provided between the lower nut members 248 and 252 and the head member.

In order positively to limit downward movement of guide and support rods 230 and 232, collar members 260 and 262 are fixed on these rods by set screws 264. The collars are positively restrained against upward movement relative to the rods by flanges 266 and 268 on the rods, and the collars are adapted to engage upper ends of the sleeve members 220 and 224 so as to limit downward movement of the rods. With this structure, it is seen that the head assembly will be drawn down to a predetermined lower limit when the hydraulic cylinders 210 and 212 are actuated so as to retract the piston rods 226 and 228. After the cam surface generating operation has been completed, the cylinders 210 and 212 are actuated to extend the piston rods 226 and 228 and thereby raise the head assembly.

In order to assist the hydraulic cylinders in raising the head assembly, compression springs 270 and 272 are disposed between lugs 274—276 and 278—280 on the head frame member and base frame member. The springs are retained in position by guide rods 282 and 284 respectively secured to the lugs 274 and 278 and slidably extending through apertures in the lugs 276 and 280.

Telescopically associated and relatively slidable tubular shields 286 and 288 are respectively secured to the upper end portion of the sleeve member 220 and the collar 260 so as to prevent dirt or any other foreign material from contaminating the rod 230 or the interior bearing surfaces of the sleeve member. Similar telescopically associated shields 290 and 292 are provided on the sleeve member 224 and collar 262. In addition, a shield 294 for essentially the same purpose is secured to and depends from the chuck and cooperates with a sealing ring 296 mounted in a recess in an annular surface of the frame member 72 as shown in Fig. 4.

The base assembly is provided with means shown in Figs. 1, 3, 4 and 8 for automatically lubricating the spindle bearings 74 and 76 and the cam members 110 and 112 during each cycle of operation of the apparatus. More specifically, a lubricating oil reservoir 296 is mounted on the plate member 176 of the frame adjacent the cylindrical frame portion 216 housing the hydraulic cylinder 212. The lubricating oil reservoir comprises a base block 298 to which is secured an upstanding wall member 300 that is closed by a plate 302 having a filling opening normally closed by a plug 304. A lubricating oil pump cylinder 306 is mounted in the base block 298 and extends vertically upwardly therefrom, in which cylinder a piston 308 is slidably disposed. The pump cylinder is provided with an inlet opening 310 which communicates with an inlet passageway 312 opening to the interior of the oil reservoir, which passageway is normally closed by a spring biased check valve 314. An outlet opening 316 of the pump cylinder communicates with a passageway 318 in the base block 298, which passageway is normally closed by a spring biased check valve 320. As will be understood, oil will be drawn from the reservoir and into the pump cylinder when the piston 308 is raised and then forced from the cylinder and into the passageway 318 when the piston is lowered.

An actuating rod 322 extends through a sealed opening in the top 302 of the oil reservoir and into a central bore in the piston 308. Any possibility of injury to the pump is prevented by providing a yieldable connection between the rod 322 and the piston, which connection comprises a pin 324 extending through aligned apertures in the piston and an elongated slot 326 in the rod. A compression spring 328 is provided between the end of the rod and the bottom of the piston for normally fully extending the piston with respect to the rod. Preferably, opposite ends of the pin project into elongated slots 330 and 332 in the pump cylinder for preventing the rod and piston from turning relative to the cylinder. The piston is actuated downwardly during each downward movement of the head assembly by a rod 334 which is connected to the head assembly support and guide rod 232 by suitable bracket means 336. The turn or upward movement of the piston 308 is accomplished by means of a spring 338 disposed in the pump cylinder beneath the piston.

Lubricating oil pumped from the reservoir and into the passageway 318 is forced through a connected passageway 340 in the base block 298 which communicates with a passageway 342 formed in the frame plate member 176. A horizontal passageway 344 in the plate member 176 connects the passageway 342 with vertically aligned passageways 346, 348 and 350 in the frame members 176, 70 and 72, respectively. A horizontal passageway 352 connects the passageway 350 with a recess 354 in the bearing member 76, which recess communicates with an aperture 356 extending through the bearing member 76 to the bearing surface thereof. Another horizontal passageway 358 in the member 70 connects the vertical passageway 348 with an aperture 360 through the bearing member 74. The drive collar 114 on the spindle 78 is provided with an annular recess 362 in its upper surface which collects oil draining from the bearing 76. A downwardly inclined passageway 364 is formed in the spindle for communicating with the recess 362 and with a vertical passageway 366 also formed in the spindle. Oil collecting in the recess 362 drains through the passageways 364 and 366 and thence through a lateral and downwardly inclined passageway 368 formed in the spindle which opens above and in alignment with the cam member 112. Oil collecting in the chamber 369 returns to the reservoir through passageways 371, 373 and 375.

Referring particularly to Figs. 1, 4, 10–12 and 14, the head assembly 64 includes in addition to the above mentioned frame member 246 a housing member 370 disposed on and secured to the frame member 246, an adapter member 372 secured on the housing 370, and an electric motor 374 having its casing secured to the adapter member or ring 372. Spindles 376, 378 and 380 for holding cutting or generating tool 382 are rotatably mounted in the head member 246.

As shown in Fig. 11, the spindle 380 is supported for rotation and against axial movement by bearing means generally designated by the numeral 384 cooperable with a lower wall 386 of the head member 246 and a plate member 388 secured to the head member. An upper end portion of the spindle 380 is also supported by bearing means 390 mounted in an upper wall portion 392 of the head member. It is understood that the other spindles are similarly supported by bearing means mounted in the head member.

In order to drive the tool holding spindles in unison, suitable gear means is provided between the motor shaft 394 and the spindles. This gear means includes a pinion 396 fixed on the motor shaft and meshing with oppositely disposed gears 398 and 399 respectively fixed on shafts 400 and 401. The shaft 400 is rotatably supported by bearing means 402 and 404 mounted in the adapter member 372 and the lower wall of the housing 370, and the shaft 401 is rotatably supported by a similar bearing means. Additional gears 406 and 407 are keyed or otherwise secured to the shafts 400 and 401 respectively and mesh with a gear 408 keyed or otherwise secured to a centrally located shaft 410 which is supported by upper and lower and intermediate bearing means 412, 414 and 416. A pinion 418 on the shaft 410 drives gears 420, 422, and 424 on the spindles 376, 378 and 380, respectively.

A lubricating oil reservoir 426 is provided within the head member 246, and oil is drawn from this reservoir by pump means 428 shown in Figs. 10 and 12 and then forced through passageway means formed in the head members 246, 270 and 372 for lubricating various elements of the gear means. The lubricating pump is a positive displacement gear-type pump and includes complementary housing members 430 and 432. The housing member 432 has an inlet passageway 434 adapted to communicate with a passageway 436 which opens in the oil reservoir 426. An outlet passageway 438 in the housing member 432 communicates with passageway means 440 in the head member 246 from which the oil is distributed to various locations in the head assembly.

A gear 442 of the lubricating pump is secured to a drive shaft 444 journalled in bearings 446 mounted in the housing member 430. The shaft 444 projects inwardly at right angles to the tool holding spindle 380. Bevelled gears 448 and 450 are respectively mounted on the spindle 380 and the shaft 444 for driving the shaft and thus the lubricating pump.

As shown in Figs. 1, 2, 3, 10 and 13, the apparatus is provided with means for automatically actuating the head assembly and the chuck assembly. This means includes the hydraulic cylinders mentioned above and hydraulic and electrical control systems therefor. More specifically, a reservoir or tank 460 for hydraulic fluid is mounted at any convenient location adjacent the apparatus, and pumps 462 and 463 driven by electric motors 464 and 465 are connected with the reservoir for delivering hydraulic fluid from the tank into the system under pressure. Conduits 466 and 467 extend from outlets of the pumps, and preferably, the pumps are driven continuously and pressure relief valves 468 and 470 are provided in bypass lines 472 and 473 extending between the conduits 466 and 467 and the reservoir. The hydraulic power line 466 is connected to a valve 476 associated with the cylinder 104, and the hydraulic power line 467 is connected to valves 478 and 482, respectively, associated with the cylinders 210—212 and 120 by branch conduits 484 and 486. The valve 476 has a pair of ports connected with opposite ends of the cylinder 104 by hydraulic lines 492 and 494, and opposite ends of the cylinders 210 and 212 are connected with ports of the valve by conduits 496—497 and 498—499. Ports of the valve 482 are connected with opposite ends of the cylinder 120 by lines 504 and 506. Drain ports of the valves are respectively connected to a drain line 508 which extends back to the reservoir by branch conduits 510, 512 and 518. These valves are two-positioned valves of known commercially available construction which are adapted selectively to direct hydraulic fluid under pressure to opposite ends of their associated hydraulic cylinders. The valves are respectively provided with spring means 515, 517 and 519 for normally retaining the stems thereof in position so that hydraulic fluid is directed into the cylinders 104, 210 and 212 to maintain the piston rods 106, 226 and 228 in extended positions, and so that hydraulic fluid is directed into the cylinder 120 so that the piston rod 138 is maintained in a retracted position. Solenoids 520, 522 and 526 are respectively provided at the valves for shifting the valve stems so as to direct hydraulic fluid into the cylinders 104, 210 and 212 for retracting their associated piston rods and into the cylinder 120 for extending the rod 138.

The electric motor 374 of the head assembly and the hydraulic pump motors 464 and 465 are connected with electric power lines L1, L2 and L3 by suitable wires. Switch means 538, 540 and 542 of known construction are connected in these wires for controlling the motors.

A switch box 544 is mounted on the base frame of the apparatus and incorporates a starting switch 546 that controls the solenoid of the valve 478, a switch 548 which controls the solenoid of the valve 476 and thus, the chuck closing cylinder 104, a switch 550 which controls the solenoid of the valve 482 and thus the cylinder 120 and a switch 552 which serves to control the return of the parts to their starting positions. The electrical system is diagrammatically shown in Fig. 2 and includes power lines 528 and 530 connected between the lines L1 and L2 and a voltage reducing transformer 532. A line 534 extends from the transformer to a master start and stop push button switch 536 from which a wire 537 extends to one end of a solenoid 539 of a magnetic relay 541. A wire 543 extends from the transformer and is connected to a terminal 545 of the relay adapted to be engaged by a switch member 547 which is also engageable with a terminal 549. The relay includes a second switch member 551 engageable with terminals 553 and 555, which switch members are normally resiliently held in opened positions and are closed simultaneously when the solenoid 539 is energized.

The switch 552 is constructed so that it is normally maintained in a closed condition by a spring means or the like and has one terminal connected to the power line 543 by wires 554 and 556. A wire 558 extends from a second terminal of the switch 552 to the terminal 553 of the starter switch means relay 541. One terminal of the momentary contact push button starting switch 546 is also connected to the wire 554 by a branch wire 559. The other terminal of the switch 546 is connected to a second terminal of the solenoid 539 and to the relay terminal 555 by a wire 561 and suitable branch wires. The relay terminal 553 is connected with the valve solenoid 552 by wires 568, 570 and 571, which solenoid is also connected with the relay terminal 549 by wires 572 and 574. Thus, it will be seen that when the start button of the switch 536 is pressed and the start button 578 of the switch 546 is momentarily depressed, the solenoid 539 will be energized so as to close the switch members 547 and 551. As a result, a holding circuit within the relay is closed to maintain the solenoid 539 energized and, in addition, the solenoid 522 will be energized to shift the valve 478 to actuate the hydraulic cylinders 210 and 212 to lower the head assembly 64.

The switch 548 which is normally maintained in an open condition by spring means or the like is connected between the wire 554 and a lead of the solenoid 520 by wires 588 and 590. The other lead of the solenoid 520 is connected to the wire 568 by a wire 592. In order to close the switch 548 and thereby cause the hydraulic cylinder 104 to be actuated so as to close the chuck jaws, a cam 594 is mounted on the head assembly for engaging a cam follower 596 on a switch actuating arm 598 of the switch 548. The cam 594 is adjustably mounted by suitable means to the head member 246 so that during downward movement of the head assembly, the cam 594 engages the cam follower 596 and closes the switch 548.

The switch 550 which is also normally maintained in an open condition has one terminal connected with the wire 554 by a wire 600 and another terminal connected to the solenoid 526 by a wire 602. Another lead of the solenoid 526 is connected to the wire 570 by a branch wire 604. An adjustable screw 606 is supported by a bracket mounted to the head member 246 for engaging and closing the switch member 550 during downward movement of the head member. Preferably, the screw 606 is adjusted so as to close the switch 550 just prior to the lower limit of the downward movement of the head assembly.

In order to return the head assembly and the chuck to their starting positions, the switch 552 is opened. This breaks the circuit energizing the solenoid 539 so that the switch members 547 and 551 open whereby the valve solenoid 522 is deenergized and the hydraulic cylinders 210 and 212 are actuated so as to raise the head assembly. At the same time, the circuit of the valve solenoid 526 is opened so that the hydraulic cylinder 120 is actuated so as to reverse the rotation of the spindle 78 and the chuck carried thereby. In order to open the switch 552 at the proper instant, a screw 608 is adjustably carried by a bracket 610 which is secured to and moves with the chuck housing. The screw 608 is adapted to engage a roller 612 carried by a pivotal actuating arm 614 of the switch 552.

A brief resumé of the manner in which the apparatus of this invention is operated simultaneously to form a plurality of cam ball seats in a disk or workpiece is as follows. With all of the elements in their starting positions, the switches 538, 540 and 542 are closed so as to energize the hydraulic pump motors 464 and 465 and the head assembly motor 374. The start button of the master switch 536 is pressed. Then an operator places one of the workpieces or disks 30 on the chuck jaws and support pads so that the extension 44 of the workpiece and an adjacent extension which is provided for one of the springs 40 straddle one of the chuck jaws. Then the operator presses the start button 578 of the switch 546 so that the solenoid 539 is energized and the switch members 547 and 551 are closed to energize the valve solenoid 522. When this solenoid is energized, the valve stems of the associated valves are shifted so as to direct the hydraulic fluid under pressure into the upper end portions of the cylinders 210 and 212 whereby to retract the piston rods 226 and 228 and lower the head assembly until the collars 260 and 262 engage the stops provided by the upper ends of the sleeve members 220 and 224. During this downward movement of the head assembly, the cam 594 closes the switch 548 so that the cylinder 104 is actuated to retract the rod 106 and pull downwardly on the chuck draw bar 96 so that the chuck jaws close and securely grip the workpiece. Just prior to engagement of the collars 260 and 262 with the upper ends of the sleeve members 220 and 224, the adjustable finger or screw 606 closes the switch 550 so that the hydraulic cylinder 120 is actuated to extend its associated piston rod and thereby rotate the crank arm 118, the spindle 78 and the chuck assembly. As the spindle is rotated, the cam members 110 and 112 cooperate with each other to raise the spindle and thereby feed the workpiece axially with respect to the cutting or generating tools. After the chuck assembly has been rotated sufficiently so that the ball cam seats in the workpiece are completed, the adjustable finger or screw 608 engages and opens the switch 552, and the parts are returned to their starting positions in the manner described above. The parts will remain in their starting positions until the operator again presses the start button 546.

While the preferred embodiment of the present invention has been shown and described herein, it is obvious that many structural details may be changed without departing from the spirit and scope of the appended claims.

The invention is claimed as follows:

1. An apparatus for simultaneously generating a plurality of surfaces on a workpiece comprising head means for rotatively supporting a plurality of generating tools, a spindle mounted for rotative and axial movement in alignment with said head means, a workpiece holding chuck mounted on said spindle, means for oscillating said spindle for imparting a rotative feeding movement to the spindle and for returning the spindle to a starting position, fixed annular cam means adjacent said spindle and presenting cam surfaces inclined with respect to an axis of rotation of said spindle, a second annular cam member fixed on said spindle and presenting inclined cam surfaces engageable with said first mentioned cam surfaces for imparting an axial feeding movement to said spindle during rotative feeding movement of said spindle, said second cam member including additional inclined cam surface means, and fixed cam follower means cooperable with said additional cam surface means for maintaining said second cam member in engagement with said first mentioned cam member during feeding and return movement of the spindle.

2. An apparatus for simultaneously generating a plurality of surfaces on a workpiece comprising head means for rotatably supporting a plurality of generating tools, workpiece holding means disposed in alignment with said head means and mounted for combined rotative and axial feeding movement, means including fluid actuating cylinder means for supporting said head means and shifting said head means to and from an operative position adjacent said work supporting means, means including a second fluid actuating cylinder means for imparting rotative feeding movement to said work supporting means, annular cam means axially aligned with said work supporting means for imparting axial feeding movement to said work supporting means during rotative feeding movement of the work supporting means, and means for controlling said first and second mentioned fluid cylinder means, said control means including a manually operable switch for energizing said first mentioned fluid cylinder means so as to move said head means to said operative position, a second switch actuated by an element carried by said head means during movement of said head means to said operative position for energizing said second mentioned fluid cylinder means so as to impart rotative feeding movement to said work supporting means when said head means reaches said operative position, and another switch means operable by a member carried by said work supporting means at the completion of a surface generating operation for causing operation of said fluid cylinder means for returning said head means and said work supporting means to their starting positions.

3. An apparatus, as defined in claim 2, which includes means including fluid cylinder means for actuating said work supporting means to grip and release a workpiece, and wherein said control means includes another switch actuated by a member carried by said head means during movement of the head means toward said operative position for energizing said last mentioned fluid cylinder means to actuate the work supporting means for gripping a workpiece.

4. An apparatus for simultaneously generating a plurality of surfaces on a workpiece comprising chuck means for releaseably retaining a workpiece, tool head means axially aligned with said chuck means and including a plurality of parallel rotatable tool spindles, an axially shiftable and rotatable member connected with and supporting one of said means, guide elements associated with the other of said means for guiding said other means between starting and working positions respectively relatively widely and closely spaced from said one means, fluid cylinder structure for shifting said other means between said positions, aligned cooperable stop members respectively associated with said one means and said other means for positively locating said other means at said working position, an annular cam fixed adjacent to and axially aligned with said axially shiftable and rotatable member and having a spiral cam surface, a cam follower on said member and engaging said cam surface for automatically axially shifting said member when the member is rotated, and fluid cylinder structure for rotating said member and the means carried thereby when said other means is at said working position for relatively axially and rotatably feeding the chuck means.

5. An apparatus for simultaneously generating a plurality of surfaces on a workpiece comprising a substantially vertically disposed spindle mounted for vertical and rotative movement, a chuck mounted on an upper end of said spindle for releasably retaining a workpiece in a generally horizontal position, a head structure disposed above said chuck and including a plurality of vertically disposed rotatable spindles for holding a plurality of surface generating tools, means supporting said head structure for movement between a raised starting position and a lowered working position, aligned stop members respectively fixed adjacent said chuck and mounted with said head structure for positively locating said head structure in said lowered working position, means for automatically closing the chuck for gripping a workpiece when the head structure is moved from said raised position to the lowered position, and means for subsequently imparting axial and rotative movement to said first mentioned spindle and the chuck thereon for feeding a workpiece into engagement with generating tools, said last named means comprising an annular cam presenting a spiral cam surface axially aligned with said first mentioned spindle, and cam follower means on said first mentioned spindle engaging said cam surface.

6. An apparatus for simultaneously generating a plurality of surfaces on a workpiece comprising a substantially vertically disposed spindle mounted for vertical and rotative movement, and a chuck mounted on an upper end of said spindle for resiliently retaining a work piece in a generally horizontal position, a head structure disposed above said chuck and including a plurality of vertically disposed rotatable spindles for holding a plurality of surface generating tools, means supporting said head structure for movement between a raised starting position and a lowered working position, aligned stop members respectively fixed adjacent said chuck and mounted with said head structure for positively locating said head structure in said lowered working position, means for automatically closing said chuck for gripping a workpiece when the head structure is moved from said raised position to the lowered position, means for subsequently imparting axial and rotative movement to said first mentioned spindle and the chuck thereon for feeding a workpiece into engagement with the generating tools, and means responsive to a predetermined amount of rotation of the chuck for automatically returning the chuck and the head structure to their initial positions.

References Cited in the file of this patent

UNITED STATES PATENTS

| | | |
|---|---|---|
| 529,013 | Barnes | Nov. 13, 1894 |
| 1,653,538 | Barrett | Dec. 20, 1927 |
| 2,213,251 | Lundberg et al. | Sept. 3, 1940 |
| 2,229,095 | Kocher | Jan. 21, 1941 |
| 2,273,870 | Kampmeier et al. | Feb. 24, 1942 |
| 2,610,449 | Cargill | Sept. 16, 1952 |
| 2,619,878 | Herzberg | Dec. 2, 1952 |
| 2,710,563 | Messmer | June 14, 1955 |
| 2,738,711 | Carlson et al. | Mar. 20, 1956 |
| 2,773,562 | Thomas | Dec. 11, 1956 |

OTHER REFERENCES

Publication: Machinery Magazine, September 1931, vol. 38, page 78.